(12) United States Patent
Flowers et al.

(10) Patent No.: US 7,070,059 B1
(45) Date of Patent: Jul. 4, 2006

(54) PORTABLE HOIST FOR VEHICLE

(75) Inventors: Jordan M. Flowers, Mantua, NJ (US); Thomas R. Talalaj, Jr., Mantua, NJ (US)

(73) Assignee: Electric Mobility Corporation, Sewell, NJ (US)

( * ) Notice: Subject to any disclaimer, the term of this patent is extended or adjusted under 35 U.S.C. 154(b) by 15 days.

(21) Appl. No.: 10/799,751

(22) Filed: Mar. 10, 2004

Related U.S. Application Data

(60) Provisional application No. 60/453,759, filed on Mar. 10, 2003.

(51) Int. Cl.
*B66C 23/44* (2006.01)

(52) U.S. Cl. ................ 212/180; 414/543; 414/921

(58) Field of Classification Search .............. 212/179, 212/180; 414/921, 543
See application file for complete search history.

(56) References Cited

U.S. PATENT DOCUMENTS

| | | | |
|---|---|---|---|
| 1,271,277 A | 7/1918 | Chabala | |
| 1,584,117 A | 5/1926 | Mitchell | |
| 1,688,507 A | 10/1928 | Schuh | |
| 1,720,714 A * | 7/1929 | Bergesen, Sr. | 212/239 |
| 2,419,145 A * | 4/1947 | Kersenbrock et al. | 414/672 |
| 3,273,219 A * | 9/1966 | Tuschen | 27/27 |
| 3,804,263 A * | 4/1974 | Castonguay | 212/180 |
| 4,096,952 A * | 6/1978 | Diggs | 212/176 |
| 4,127,200 A | 11/1978 | Mann | |
| 4,391,379 A | 7/1983 | Paffrath | |
| 4,406,574 A | 9/1983 | Riley | |
| 4,542,917 A * | 9/1985 | Waite | 280/650 |
| 4,556,358 A | 12/1985 | Harlan | |
| 4,671,729 A | 6/1987 | McFarland | |
| 4,799,849 A | 1/1989 | Miller | |
| 4,881,864 A | 11/1989 | Amato | |
| 4,991,810 A * | 2/1991 | Andrus et al. | 248/286.1 |
| 5,029,717 A | 7/1991 | Chambers et al. | |
| 5,090,580 A | 2/1992 | Nelson | |
| 5,205,700 A | 4/1993 | Lin et al. | |
| 5,242,257 A * | 9/1993 | Avakian | 414/462 |
| 5,431,526 A | 7/1995 | Peterson et al. | |
| 5,810,547 A | 9/1998 | Bruno et al. | |
| 6,007,289 A | 12/1999 | Kruse et al. | |
| 6,334,590 B1 * | 1/2002 | Landry | 244/137.1 |
| 6,401,863 B1 * | 6/2002 | Kirkland | 182/142 |
| 6,547,507 B1 * | 4/2003 | Gest et al. | 414/543 |

* cited by examiner (Continued)

*Primary Examiner*—Thomas J. Brahan
(74) *Attorney, Agent, or Firm*—Frijouf, Rust & Pyle, P.A.

(57) ABSTRACT

An improved hoist is disclosed to reposition a load relative to a vehicle compartment such as a trunk of a vehicle. The hoist comprises a base for location on a generally horizontal lower surface of the vehicle compartment. A horizontal telescoping shaft has a first and second distal end extending from opposed sides of the base for engaging with opposed generally vertical surfaces of the vehicle compartment. A horizontal expander coacts between the first and second distal ends for applying a horizontal engaging force between the opposed generally vertical surfaces of the vehicle compartment for horizontally stabilizing the base within the vehicle compartment. A vertical telescoping shaft having a distal end extends vertically from the improved hoist for engaging with a upper generally horizontal surface of the vehicle compartment. A vertical expander coacts between the base surface and the distal end of the vertical telescoping shaft for applying a vertical engaging force between the lower and upper generally horizontal surfaces of the vehicle compartment for vertically stabilizing the base within the vehicle compartment. A column extends from the base for supporting a boom for repositioning the load relative to the vehicle.

18 Claims, 9 Drawing Sheets

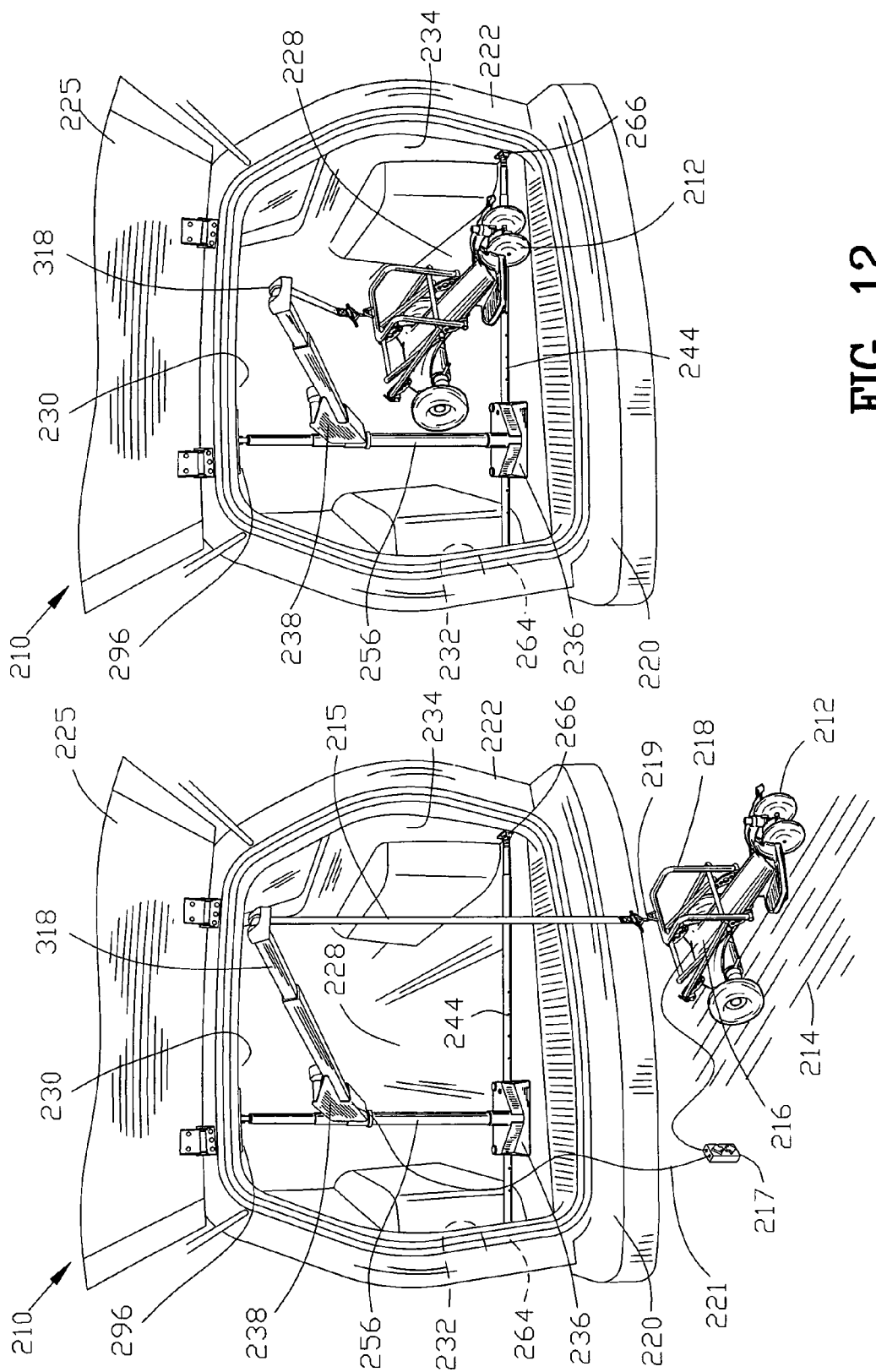

PORTABLE HOIST FOR VEHICLE

CROSS-REFERENCE TO RELATED APPLICATIONS

This application claims benefit of U.S. patent Provisional application Ser. No. 60/453,759 filed Mar. 10, 2003. All subject matter set forth in provisional application Ser. No. 60/453,759 is hereby incorporated by reference into the present application as if fully set forth herein.

BACKGROUND OF THE INVENTION

1. Field of the Invention

This invention relates to a hoist and more particularly to an improved hoist to reposition a load to and from a vehicle compartment such as a trunk of an automobile, van or other type of vehicle.

2. Background of the Invention

The prior art has provided many different and diverse devices for lifting a load. Some of the devices of the prior art utilized a hoist either attached to an exterior or an interior surface of a vehicle in order to reposition a load between a vehicle and an external surface. The hoists attached to an interior surface of the vehicle had to be relatively compact to conserve the necessary volume for the load.

One particular specialized load is a personal mobility vehicle. Although the personal mobility vehicles provide the desired mobility to the physically challenged user, many of the personal mobility vehicles were difficult to load and unload from a vehicle such as a trunk of an automobile, van or other type of vehicle. The prior art has solved the problem of loading and unloading from a vehicle by utilizing a hoist to reposition the personal mobility vehicle between the vehicle and the external surface.

Some of the hoists of the prior art were attached to an interior surface of the vehicle by mechanical fasteners, including bolting, rivets and the like. The process of attaching a hoist to the interior surface of the vehicle by mechanical fasteners required drilling in potential hazardous areas such as areas in proximity to electrical wires and/or a fuel tank of the vehicle. In many instances, the process of drilling in potentially hazardous areas required a professional installer for permanently attaching the hoist to the interior surface of the vehicle by mechanical fasteners.

The following U.S. Patents represent several attempts of the prior art to provide a solution for repositioning a personal mobility vehicle between a vehicle's trunk and an external surface.

U.S. Pat. No. 1,271,277 to Chabala discloses an apparatus of the class described comprising a supporting standard. A beam coacts with the standard and is mounted for longitudinal movement independently of the standard. A load carrying means coacts with an end portion of the beam. A rotary member is supported by the standard and provided with an operating means. A pulling member is secured to the beam and engageable with the rotary member whereby the beam is moved longitudinally upon rotation of the rotary member in one direction. Means is provided for disengaging the pulling member from the rotary member. A holding member coacts with the rotary member for normally holding the same against rotation in one direction. Means is provided for operating in unison with the last named means for disengaging the holding member from the rotary member when the pulling member is disengaged from the rotary member.

U.S. Pat. No. 1,584,117 to W. M. Mitchell discloses a crane. A mast formed of two alined parts is freely rotatable relative to each other, with one of the parts being longitudinally extensible. A windlass and a boom are connected to one of the parts of the mast. Means is provided to secure the upper and lower ends of the mast, consisting of a socket adapted to be pressed against the ceiling of a building and in which the upper end of the mast is rotatable and a lower contact plate connecting to the lower end of the mast by means of a universal joint.

U.S. Pat. No. 1,688,507 to O. H. Schuh discloses in a hoisting apparatus and in combination, an upright post having a diametrical slot in its upper portion, a member movable vertically on the post, and having a sleeve receiving the post, said sleeve being provided with a slot and with an offset portion opposite the slot. A sheave is mounted in the slotted portion of the post and disposed in the post slot and the sleeve slot and adapted to move in the offset portion of the sleeve. A cable is trained over the sheave and connected to the vertically movable member and crane means and carried by and extending laterally from said sleeve of the vertically movable member.

U.S. Pat. No. 4,127,200 to E. T. Mann discloses an apparatus for hoisting a wheel chair into and out of an enclosure including a swivel base having a stationary section that may be secured within the closure and a section rotatable on the stationary section about a vertical axis. A motor mount is positioned above and is connected to the rotatable section of the swivel base. An angled arm is pivotally connected to the motor mount and is capable of standing rigidly upright when in use and capable of folding down when not in use. A cable, attached to a reel at one end, has a series of pulleys located on the angled arm to guide the cable over the angled arm. The reel is formed to the motor mount and is connected to a motor on the motor mount through use of gearing. A hook is formed at the other end of the cable for use in hoisting.

U.S. Pat. No. 4,391,379 to E. C. Paffrath discloses a lifting device adapted to be mounted within an automobile trunk having a rigid boom mounted for free pivotal movement about both vertical and horizontal axes. The lifting device includes a motor-driven lift mounted at the distal end of the boom. A counterbalance member is employed to counterbalance the gravitational force biasing the boom in downward movement about its horizontal axis so the boom may be pivoted upwardly or downwardly by a handicapped person. A prop assembly may be manually moved into position to positively maintain the boom in an elevated lifting position.

U.S. Pat. No. 4,406,574 to S. L. Riley discloses a device for lifting and loading objects into and from a storage space of an automobile for transportation thereby. The device is fully contained within the storage space and is adapted to be mounted directly to the chassis of the automobile. The device is particularly suited to assist disabled individuals who may be unable to lift, load and transport such objects otherwise.

U.S. Pat. No. 4,556,358 to B. C. Harlan discloses a portable hoist provided for lifting, transporting, and depositing loads onto a platform, such as a work bench, or into a vehicle, such as a pick-up truck. The portable hoist comprises a mounting for attachment to a support, an upright support structure connected to the mounting by a hinge which allows for swinging movement of the support structure about its vertical axis, and a boom pivotally secured at one end to the upper end of the support structure such that the free end of the boom can be raised and lowered. A powered unit acts between the support structure and the boom and serves to raise and lower the boom. A sheave is carried at the free end of the boom and a hoist line connected to the support structure at a level substantially below the pivotal connection of the structure to the boom loops over the sheave and carries a member for attachment to the load to be lifted.

U.S. Pat. No. 4,671,729 to R. E. McFarland discloses an apparatus for loading a scooter-type wheelchair or similar object into a vehicle compartment such that the apparatus and wheelchair loaded thereon are fully contained within the vehicle when in a storage position. The apparatus includes a frame attachable to a lower surface of the vehicle compartment and a platform upon which the wheelchair may be rolled. A pair of upper links and a pair of lower links interconnect the frame and platform. A drive shaft interconnects the lower links, and the shaft may be rotated by an electric motor. Each upper link has a drive shaft that is connected to the first link drive shaft by a chain and sprocket assembly. Thus, as the motor rotates the lower link drive shaft, all links are rotated which raises the platform and wheelchair upwardly, traversing toward the vehicle compartment and lowering the platform and wheelchair into the compartment for storage. During this cycle, the platform passes through a vertical plane defining a maximum elevation. The platform includes wheel locators and positioning plates for locating the wheels of the wheelchair as it is positioned on the platform and for preventing the wheelchair from undesired movement once loaded.

U.S. Pat. No. 4,799,849 to D. L. Miller discloses a motorized lifting device for loading and unloading articles from automobile trunks having a floor frame acting as a base for a pair of upstanding platform supports each of which has a flange. A carriage having a plurality of rollers is reciprocally mounted on each upstanding platform support such that at least two spaced apart rollers are on one side of the flange and at least one roller is on the other side of the flange. The flange, therefore, acts as a guide for the carriages when moving along the upstanding platform support. A platform frame is attached to the carriages and a platform rests on the platform frame. Lifting is achieved through means of a cable attached to each carriage, strung over a pulley on each upstanding platform support that is then wound onto a spool rod mounted to the upstanding platform supports. The spool rod is rotated by means of an electric motor powered by electricity from the automobile. In one alternative embodiment, the platform is slidably mounted on the platform frame; in another alternative embodiment, the floor frame, the platform frame, and the platform are adjustable for accommodating variously sized automobile trunks.

U.S. Pat. No. 4,881,864 to J. G. Amato discloses a swingable boom-type hoist which is characterized by a forwardly-projecting tongue of rectangular cross section that telescopes into the box-beam style drawbar of a conventional trailer hitch carried by the load-carrying vehicle thus cooperating therewith to maintain the stanchion from which the tongue projects in an upright position. The boom on the upper end of the stanchion can swing through a complete circle and is preferably vertically adjustable. An important feature is the retractable foot on the lower end of the stanchion which can be raised off the ground while the load in the load-carrying vehicle is transported from one place to another without having to dismount the hoist. A conventional winch is used to raise and lower the load.

U.S. Pat. No. 5,029,717 to J. L. Chambers et al. discloses a crane or lifting device including a base assembly with a telescopic and rotatable column mounting and a boom assembly including a telescopic boom arm. A strap is connected at one end thereof to the base assembly, extending through the boom arm, and is connected at another end thereof to a hook for engaging a load. An extensible/retractable jack assembly innerconnects the column and the boom arm for raising and lowering the boom arm. The crane can be mounted in an automobile trunk for raising and lowering the boom assembly.

U.S. Pat. No. 5,090,580 to W. O. Nelson et al. discloses a portable crane for hoisting electric scooters, wheelchairs and the like including a column assembly, a boom assembly, a base assembly and a winch assembly. The column assembly is removably and pivotally mounted between an opened vehicle trunk lid and a trunk floor. The column assembly includes top and bottom pivot pins which rotatably engage pivot pin receiving holes and about which the boom assembly rotates. The column assembly and boom assembly are collapsible so as to allow the trunk lid to close.

U.S. Pat. No. 5,205,700 to J. Lin et al. discloses an attachment for the rear of a motor vehicle for transporting a personal mobility vehicle including a load carrying frame pivotally attached to a first frame member and is pivotable from a storage position to an extended load carrying position transverse to and extending rearwardly from the first frame member. Such support arms on each side of the attachment are provided to attach the frame members together in the extended position. A load securing cross member is secured at one end to the center of the first frame member and at its opposite end to the center of the rear frame member. A hoist mechanism may be attached to one end of the first frame member rotatable on the support about a vertical axis and pivotable thereon in a vertical plane.

U.S. Pat. No. 5,431,526 to E. A. Peterson et al. discloses a lift mountable in a transporting vehicle for loading and unloading objects such as small motorized carts. The lift includes an adjustable stand and pivotal boom assembly. An electric motor selectively operates a drum on which is wound a lifting cable or strap which terminates at a lifting hook or claw which is attachable to the cart or object. The adjustability of the stand and boom make the lift highly versatile and adaptable for convenient mounting in different vehicle configurations.

U.S. Pat. No. 5,746,563 to D. Steckler discloses a standard motor car which includes a luggage compartment, there is affixed to one point in that compartment a collapsible wheel chair. The compartment also contains a mechanical, motor operated feature which lifts the wheel chair from the compartment and transports it to a point beside the car, easily approachable by an invalid driver who can now shift himself from the driver's seat to the wheel chair.

U.S. Pat. No. 5,810,547 to M. R. Bruno et al. discloses an improved vehicle lift assembly for loading and unloading objects into and from a vehicle. The improved vehicle lift assembly includes a base configured for being mounted to the vehicle and a vertical post extending from the base. An extension boom extends outward from a centerline of the post with a swing arm rotatably coupled to the extension arm. The swing arm supports an engaging mechanism for releasably engaging the object. An actuator raises and lowers the engaging mechanism to raise and lower the engaged object.

U.S. Pat. No. 6,007,289 to T. Kruse et al. discloses a self propelled personal mobility vehicle lift operable in a stored configuration and a deployed configuration operatively mounted to the rear portion of a vehicle to selectively lift and remove a self propelled personal mobility vehicle into and from the rear portion of the vehicle. The self propelled personal mobility vehicle lift includes a stanchion or tower assembly pivotally mounted to a lift mounting assembly secured to the vehicle. A boom assembly supports a hoist assembly and a lift support assembly to support the self propelled personal mobility vehicle lift when deployed telescopingly coupled to the upper and lower portions of the stanchion or tower assembly respectively. The hoist assembly includes a hoist mechanism having a flexible hoist element to couple the self propelled personal mobility vehicle lift to the self propelled personal mobility vehicle when the self propelled personal mobility vehicle lift is in the deployed configuration to selectively lift or lower the self propelled personal mobility vehicle into or from the rear portion of the vehicle.

Therefore, it is an object of the present invention to provide an improved hoist that requires no alterations of the interior of the vehicle.

Another object of this invention is to provide an improved hoist that can be supported by the interior of the vehicle without the need for drilling holes for mechanical fasteners.

Another object of this invention is to provide an improved hoist that can be utilized in different vehicle interior configurations.

Another object of this invention is to provide an improved hoist that can be installed and removed from the interior of the vehicle without the need for professional assistance.

Another object of this invention is to provide an improved hoist that can be transferred from one vehicle to another in a short period of time.

Another object of this invention is to provide an improved hoist that is light weight.

Another object of this invention is to provide an improved hoist that is inexpensive.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved hoist to reposition a load between a vehicle compartment and an external surface. The vehicle compartment has plural opposed surfaces and a lower generally horizontal surface. The hoist comprises a base having a base support and a base surface. The base surface of the base is located on the generally lower horizontal surface of the vehicle compartment. A telescoping shaft has a first and a second distal end with an intermediated portion of the telescoping shaft being secured relative to the base. The first and second distal ends of the telescoping shaft engage with the opposed surfaces of the vehicle compartment. An expander coacts between the first and second distal ends of the telescoping shaft for applying an expanding force between the first and second distal ends to engage with the opposed surfaces of the vehicle compartment for stabilizing the base within the vehicle compartment. A column extends relative to the base for supporting a boom to reposition the load between the vehicle compartment and the external surface.

In another embodiment of the invention, the invention relates to an improved hoist to reposition a load between a vehicle compartment and an external surface. The vehicle compartment has plural opposed generally vertical surfaces and lower and upper generally horizontal surfaces. The hoist comprises a base having a base support and a base surface. The base surface of the base is located on the generally lower horizontal surface of the vehicle compartment. A horizontal telescoping shaft has a first and a second distal end with an intermediate portion of the horizontal telescoping shaft being secured relative to the base. The first and second distal ends of the horizontal telescoping shaft engage with the opposed generally vertical surfaces of the vehicle compartment. A horizontal expander coacts between the first and second distal ends of the horizontal telescoping shaft for applying a horizontal expanding force between the first and second distal ends to engage with the opposed generally vertical surfaces of the vehicle compartment for horizontally stabilizing the base within the vehicle compartment. A vertical telescoping shaft having a distal end is secured relative to the base. The distal end of the vertical telescoping shaft engages with the upper generally horizontal surface of the vehicle compartment. A vertical expander coacts between the base surface and the distal end of the vertical telescoping shaft for applying a vertical expanding force to engage with the generally lower and upper horizontal surfaces of the vehicle compartment for vertically stabilizing the base within the vehicle compartment. A column extends relative to the base for supporting a boom to reposition the load between the vehicle compartment and the external surface.

In a more specific embodiment of the invention, the improved hoist repositions a personal mobility vehicle between an automobile or van compartment and an external surface. The horizontal expander comprises a first and a second threaded receptacle engaging with the first and second distal ends of the horizontal telescoping shaft. A first and a second threaded shaft pivotally support a first and a second plate, respectively. A first and a second threaded receptacle threadably engage with the first and second threaded shafts for expanding and contracting the distance between the first and second plates. A rotation of the first and/or the second threaded receptacle about the first and second distal ends of the horizontal telescoping shaft provides a horizontal expanding force between the first and second plates for engaging with the opposed generally vertical surfaces of the vehicle compartment.

The first and second threaded shafts threadably engage with the first and second threaded receptacles, respectively. The rotation of the first and second threaded receptacles cause the first and second plates to expand outward to apply a horizontal engaging force between the first and second distal ends and the opposed vertical surfaces of the automobile trunk for horizontally stabilizing the base within the automobile trunk. A vertical expander comprises a third plate pivotally secured to a third threaded shaft. A third threaded receptacle engages with a distal end of the vertical telescoping shaft such that the third threaded receptacle will rotate about the third distal end of the vertical telescoping shaft. The third threaded shaft threadably engages with the third threaded receptacle. The rotation of the third threaded receptacle will cause the third plate to expand outward to apply a vertical engaging force between the lower and upper horizontal surfaces of the vehicle compartment for vertically stabilizing the base within the vehicle compartment.

In one embodiment of the invention, a horizontal telescoping shaft comprises a pipe jack to apply a horizontal expanding force to engage the opposing vertical surfaces of the vehicle compartment for horizontally stabilizing the base within the vehicle compartment. A vertical telescoping shaft comprises a pipe jack to apply a vertical expanding force to engage the lower and upper horizontal surfaces of the vehicle compartment for vertically stabilizing the base within the vehicle compartment.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 11 is an isometric view of a second embodiment of a hoist incorporating the present invention for repositioning the load from the external surface;

FIG. 12 is an isometric view similar to FIG. 11 illustrating the hoist repositioning the load into the van compartment;

Similar reference characters refer to similar parts throughout the several Figures of the drawings.

DETAILED DISCUSSION

Figure 1:
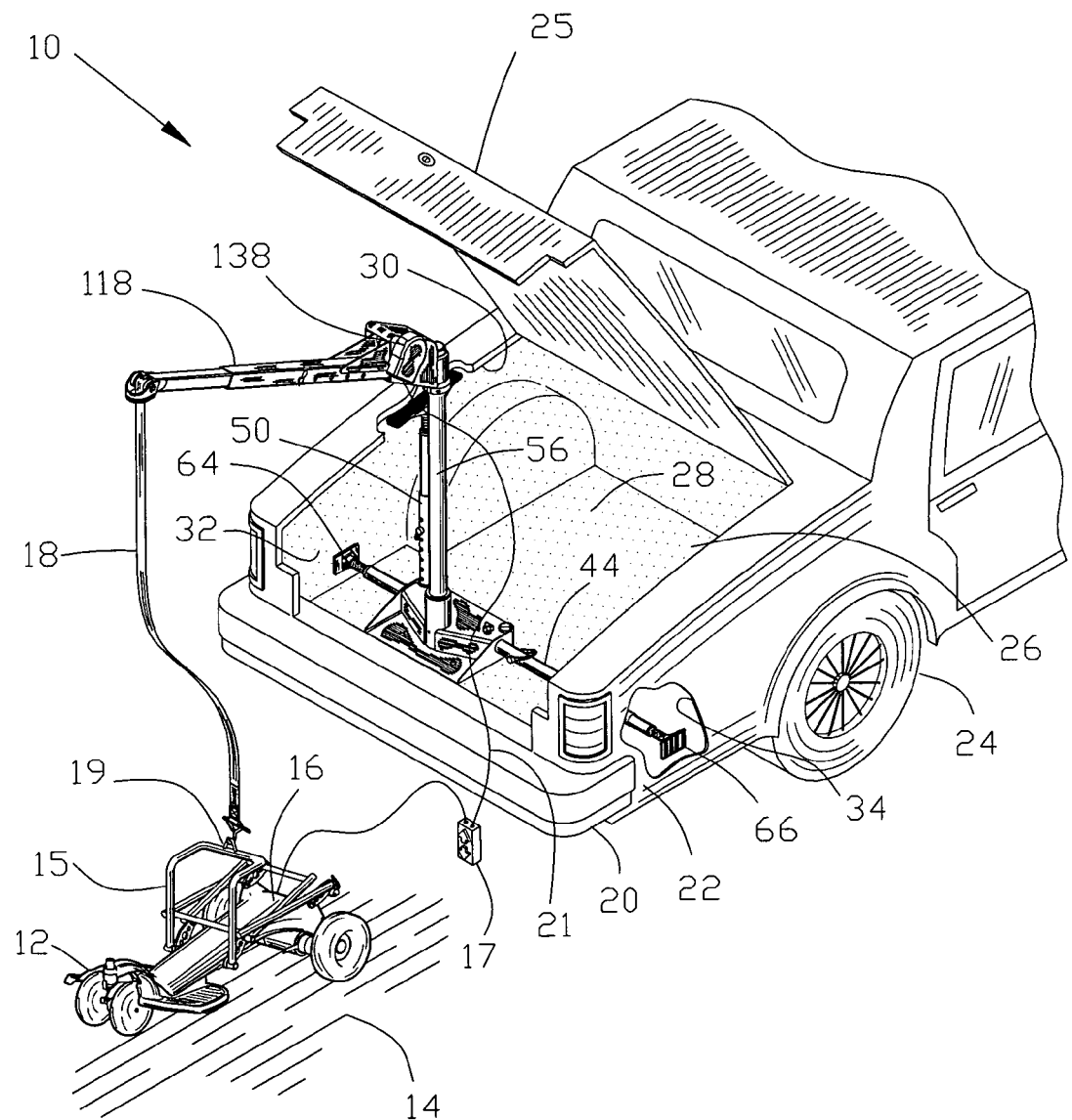
FIG. 1 is an isometric view of a first embodiment of a hoist incorporating the present invention preparing to reposition a load from an external surface to an automobile compartment.

FIG. 1 illustrates a hoist 10 incorporating the present invention for move a load 12 between an external surface 14 and a land vehicle 20. In this example, the load 12 is shown as a personal mobility vehicle having a handle 15 and a battery 16. A strap 18 having a hook 19 interconnects the hoist 10 to the handle 15 of the load 12. The strap 15 may be constructed of a nylon strap, cable wire or other similar materials.

The hoist 10 is shown preparing to reposition the load 12 from the external surface 14 into the land vehicle 20. Although the hoist 10 of the present invention is shown to reposition a personal mobility vehicle, it should be understood that the hoist 10 of the present invention is also suitable for repositioning other types of loads into an out of the land vehicle 20.

Figure 2:
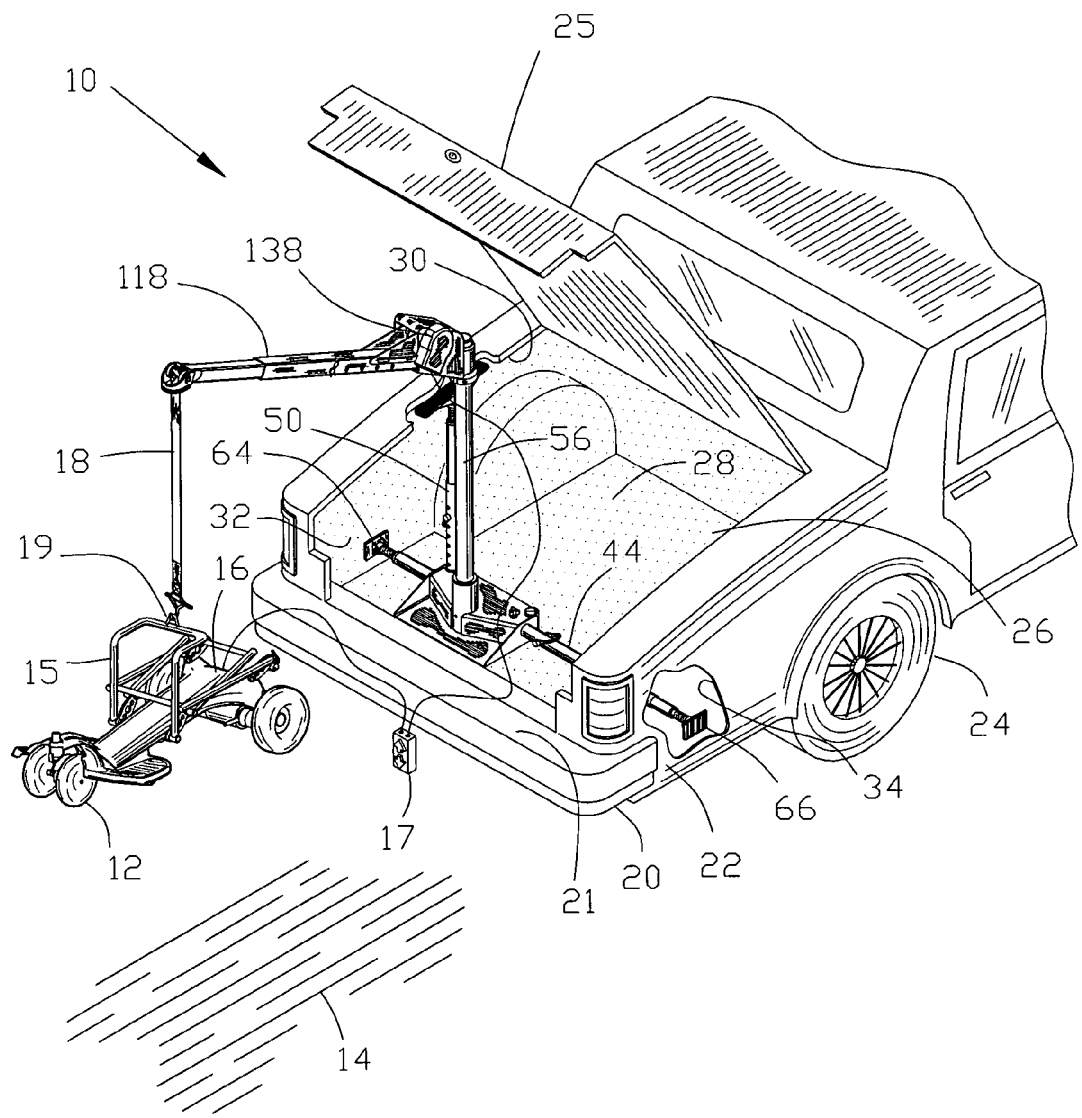
FIG. 2 is an isometric view similar to FIG. 1 with the hoist repositioning the load from the external surface to the automobile compartment.

FIG. 2 is an isometric view similar to FIG. 1 with the hoist 10 repositioning the load 12 from the external surface 14 into the land vehicle 20. The land vehicle 20 is shown having a body 22 supported by wheels 24 and a trunk lid 25 that allows access to a vehicle compartment 26. The vehicle compartment 26 comprises a lower and an upper horizontal surface 28 and 30 respectively and a first and second vertical surface 32 and 34 respectively. In this embodiment of the invention, the upper horizontal surface 28 of the land vehicle 20 is shown as a ledge of an automobile trunk.

Although the land vehicle 20 has been shown as a conventional automobile, it should be understood that the land vehicle 20 may be any suitable land vehicle, such as a van, hatchback vehicle, sports utility vehicle or the like. In addition, it should be understood that the vehicle compartment 26 may be any suitable vehicle compartment other than a conventional automobile trunk.

Figure 3:
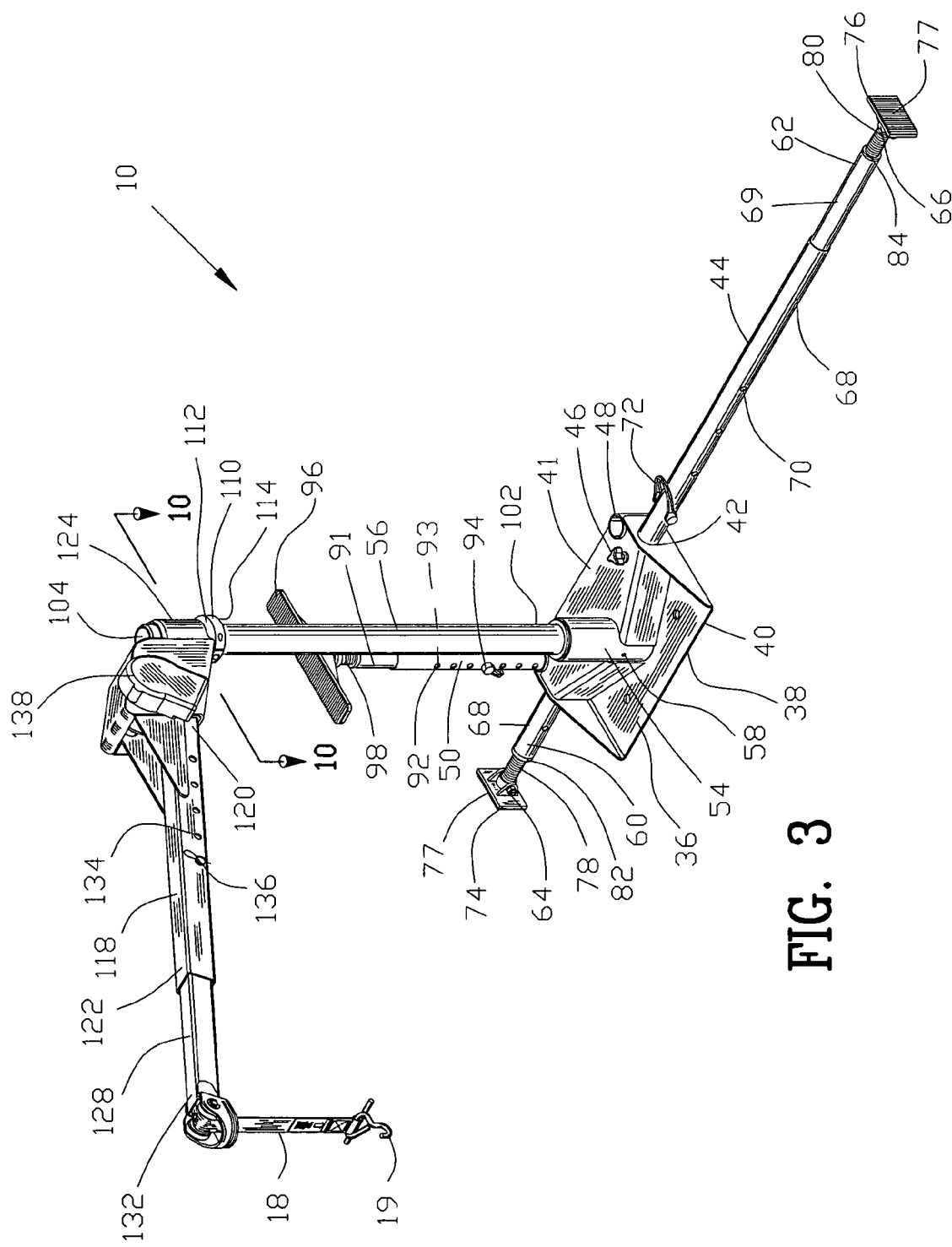
FIG. 3 is an enlarged isometric view of the hoist shown in FIGS. 1 and 2.

FIG. 3 is an enlarged isometric view of the hoist 10 shown in FIGS. 1 and 2. The hoist 10 comprises a base 36 having a base support 38 and a lower base surface 40 and an upper base surface 41. The base support 38 is in contact with the lower horizontal surface 28 of the vehicle compartment 26.

Figure 4:
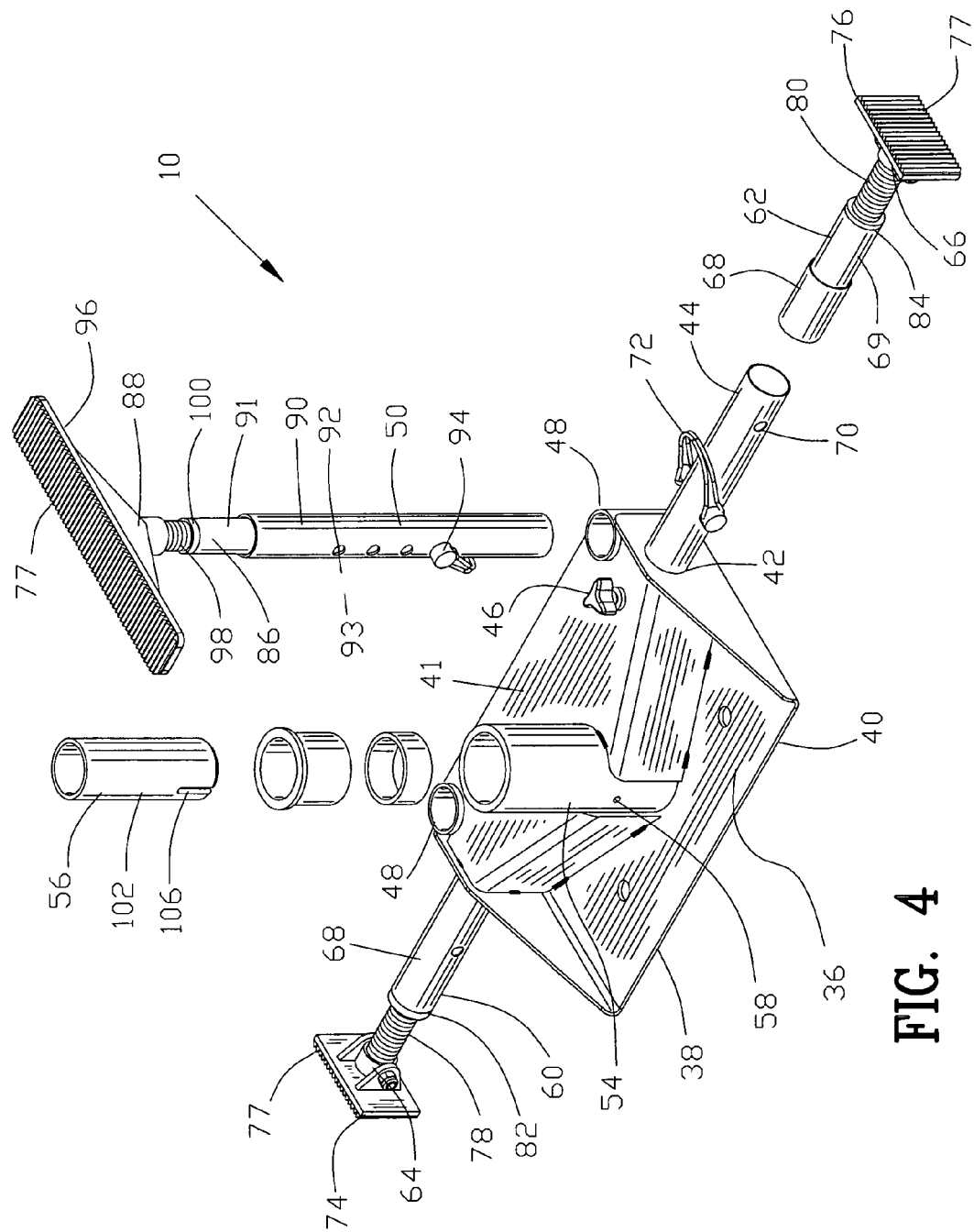
FIG. 4 is an enlarged exploded view of a base portion of the hoist shown in FIGS. 1–3.

FIG. 4 is an enlarged partially exploded isometric view of a portion of the hoist 10 shown in FIG. 3. The base surface 40 includes a horizontal channel 42 for slidably receiving a horizontal telescoping shaft 44. The horizontal location of the base 36 relative to the vehicle compartment 26 may be adjusted by sliding the base 36 along the horizontal telescoping shaft 44 until the desired horizontal position is established. Once the desired horizontal position of the base 36 is established, a plurality of locking mechanisms 46 secures the horizontal telescoping shaft 44 relative to the base 36. The locking mechanisms 46 may include screws, pins or other similar means.

The base surface 40 may further comprise a plurality of vertical sockets 48 to slidably receive a vertical telescoping shaft 50. The plurality of vertical sockets 48 allow the base to be alternatively placed in proximity of either the first vertical surface 32 or the second vertical surface 34 of the vehicle compartment 26.

Both the horizontal channel 42 and the plurality of vertical sockets 48 allow the base 36 to be selectively positioned within the vehicle compartment 26. The base 36 permits the hoist 10 to be positioned within the vehicle compartment 26 to provide the least interference with any obstructions inside the vehicle compartment 26 while permitting the vertical telescoping shaft 50 to vertically engage the upper horizontal surface of the vehicle compartment 26.

The base 36 may further comprises a vertical channel 54 to slidably receive a column 56. The vertical channel 54 has an interior pin to align and inhibit the rotation of the column 56.

Figure 5:
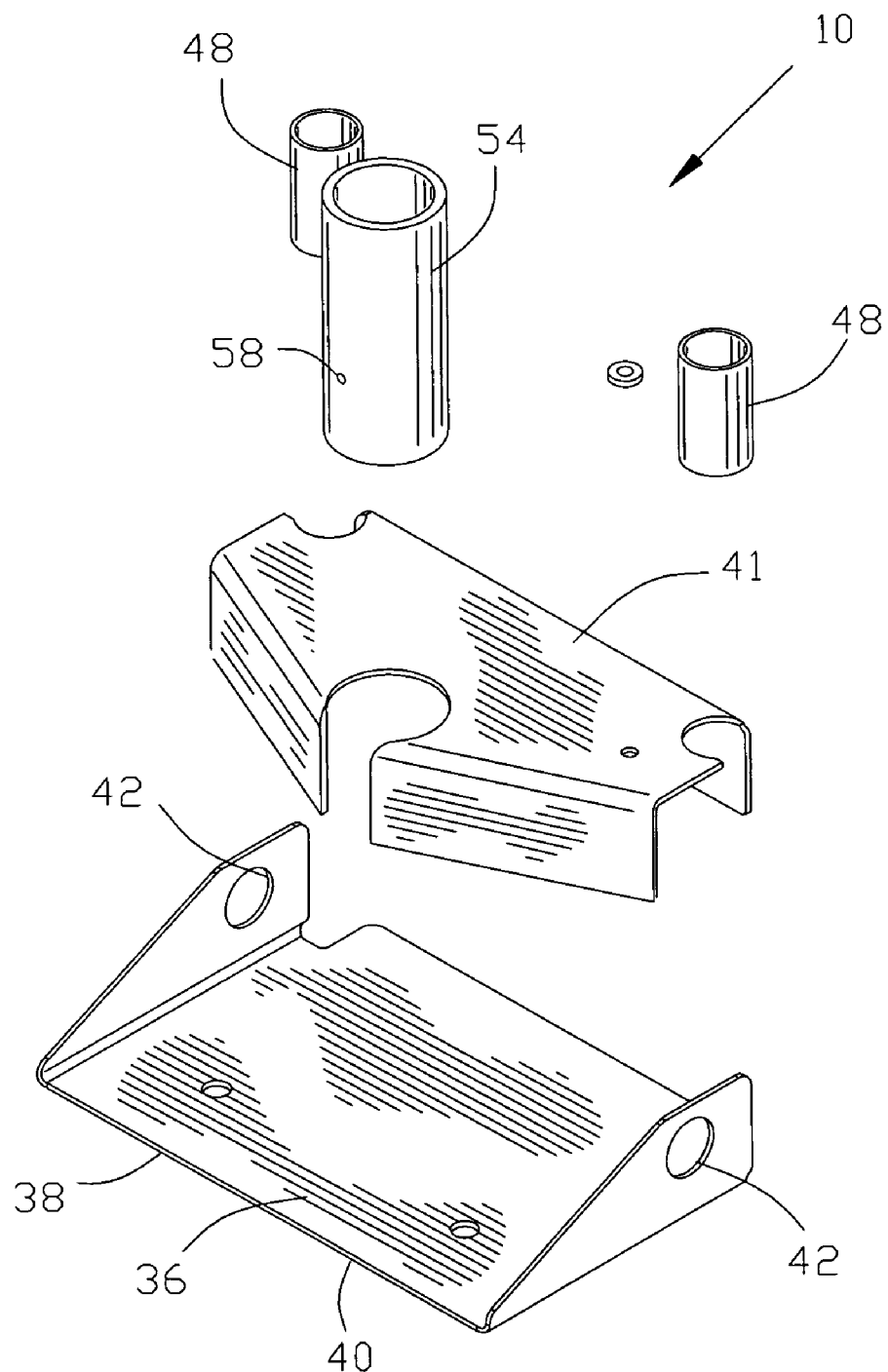
FIG. 5 is an assembled view of the base portion of the hoist shown in FIG. 4.

FIG. 5 is an exploded view of the base 36 shown in FIG. 4. In this example, the lower base surface 40, the upper base surface 41, vertical sockets 48 and vertical channel 54 are separate metallic components such as steel, aluminum or other similar material. Preferably, the lower base surface 40 and the upper base surface 41 are fabricated by a conventional metal stamping or metal bending process or any other suitable means. The vertical sockets 48 and vertical channel 54 are cut from preformed tubes.

Figure 6:
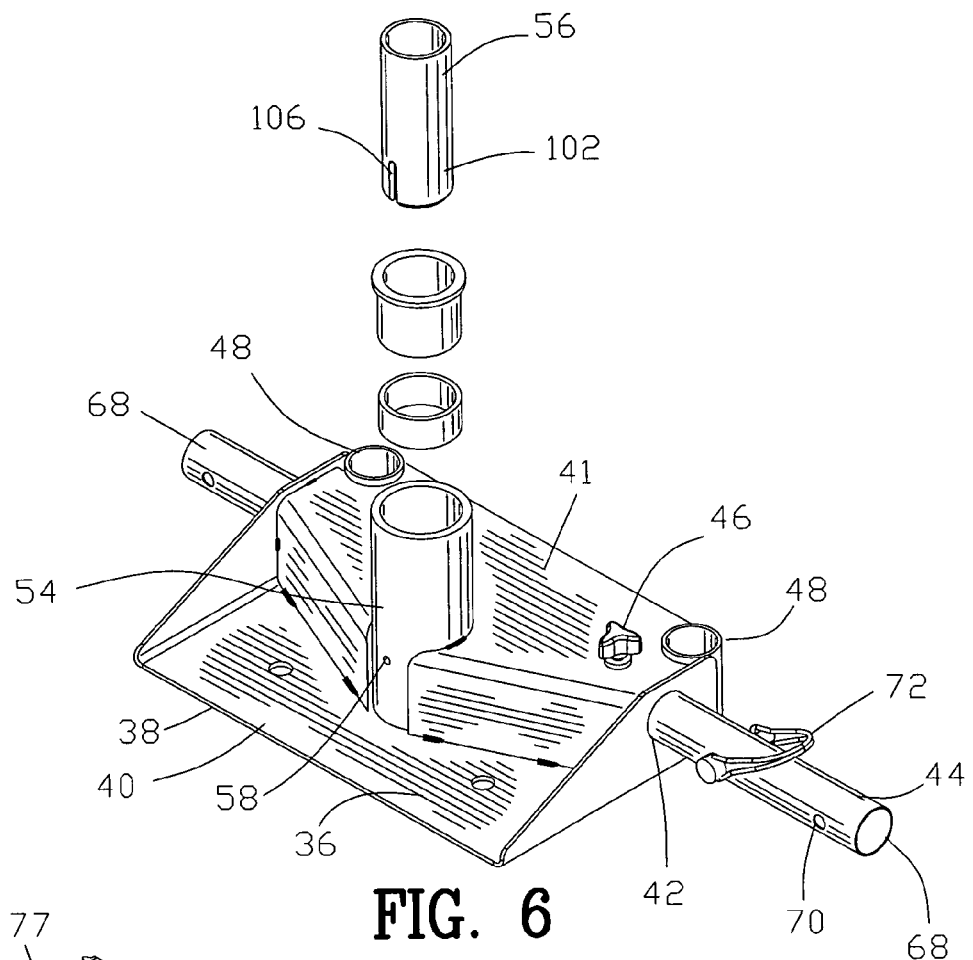
FIG. 6 is an enlarged sectional view along line 6—6 in FIG. 3.

FIG. 6 is an assembled view of the base 36 of the hoist 10 shown in FIG. 5. The lower base surface 40, the upper base surface 41, vertical sockets 48 and vertical channel 54 are fastened together by a plurality of welds. In the alternative, the separate metallic components may be fastened together by other suitable fasteners such as bolts or other similar means. In still a further alternative, the base 36 along with the horizontal channel 42, vertical sockets 48 and vertical channel 54 may be constructed on a one piece molded steel, polymer or other similar material.

Figure 7:
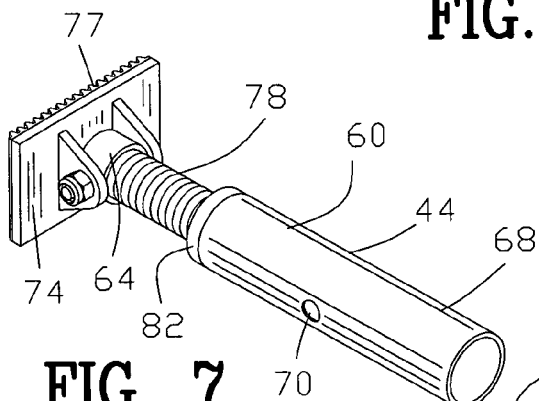
FIG. 7 is an enlarged isometric view of a portion of the hoist shown in FIG. 3 illustrating a column preparing to engage a vertical channel within the base portion of the hoist.
Figure 8:
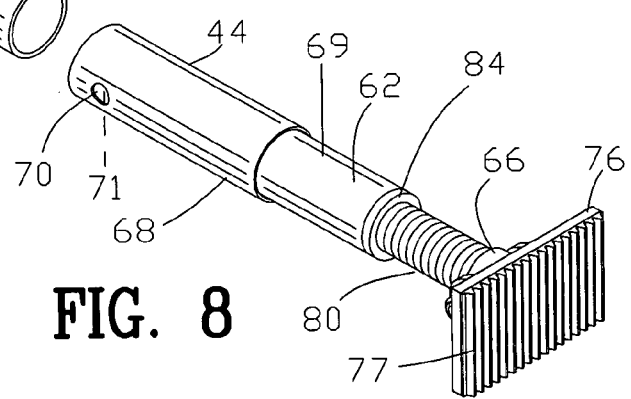
FIG. 8 is an enlarged isometric view of the first horizontal expander shown in FIG. 7.

FIGS. 7 and 8 illustrate the first and second distal ends 60 and 62 of the horizontal telescoping shaft 44. The horizontal telescoping shaft 44 comprises plural hollow tubes comprising an outer tube 68 and an inner tube 69. The outer and inner tubes 68 and 69 have diameters selected to provide a smooth telescopic engagement. The inner tube 69 may be move relative to the outer tube 68 to either lengthen or shorten the overall length of the horizontal telescoping shaft 44. The horizontal telescoping shaft 44 may be constructed of steel, aluminum or other similar material.

The outer and inner tubes 68 and 69 have a plurality of thru holes 70 and 71 defined along the length of the outer and inner tubes 68 and 69, respectively. Once the horizontal telescoping shaft 44 is extracted such that the length of the horizontal telescoping shaft 44 is commensurate with the length between the first and second vertical surfaces 32 and 34 respectively of the vehicle compartment 26, a mechanical fastener 72 passes through aligned thru holes 70 and 71 in the outer and inner tubes 68 and 69. The mechanical fastener 72 fixes the length of the horizontal telescoping shaft 44. The mechanical fastener 72 may include a screw, pin or other similar fasteners.

A first and second horizontal expander 64 and 66 respectively coacts between the first and second distal ends 60 and 62 of the horizontal telescoping shaft 44. The first and second horizontal expander 64 and 66 respectively apply a horizontal expanding force between the first and second distal ends 60 and 62 of the horizontal telescoping shaft 44. The horizontal expanding force between the first and second distal ends 60 and 62 is applied to the opposed first and second vertical surfaces 32 and 34 respectively of the vehicle compartment 26 for horizontally stabilizing the base 36 within the vehicle compartment 26.

The first and second horizontal expanders 64 and 66 comprise a first and a second plate 74 and 76 pivotally secured to a first and a second threaded shaft 78 and 80, respectively. The first and second plate 74 and 76 are pivotally secured to the first and second threaded shaft 78 and 80 to conform to different contours and/or angles of the first and second vertical surfaces 32 and 34. Preferably, the first and second plates 74 and 76 include a textured material 77 to prevent the first and second plates 74 and 76 from slipping along the first and second vertical surfaces 32 and 34. The textured material 77 may include rubber, plastic or other similar material.

A first and a second threaded receptacle 82 and 84 engage with the first and second distal ends 60 and 62 of the horizontal telescoping shaft 44. The first and second threaded shafts 78 and 80 threadably engage with the first and second threaded receptacles 82 and 84.

Preferably, the first and second threaded receptacle 82 and 84 are press fitted into the outer and inner tubes 68 and 69. An operator may rotate the inner tube 68 and the second threaded receptacle 84 by hand without the use of tools. A rotation of the second threaded receptacle 84 cause the first and second plates 74 and 76 to expand outward to apply a horizontal expanding force between the first and second distal ends 60 and 62 to engage with the first and second vertical surfaces 32 and 34. The engagement of the first and second plates 74 and 76 with the first and second vertical surfaces 32 and 34 horizontally stabilizes the base 36 within the vehicle compartment 26. Although the invention discloses a first and second horizontal expander 64 and 66 respectively, it should be understood that a horizontal expander may also comprise other means of providing a compressive force between the first and second distal ends 60 and 62 respectively, and the opposed first and second vertical surfaces 32 and 34 respectively, of the vehicle compartment 26 including a single screw jack, hydraulic expanding means or other similar methods.

Figure 9:
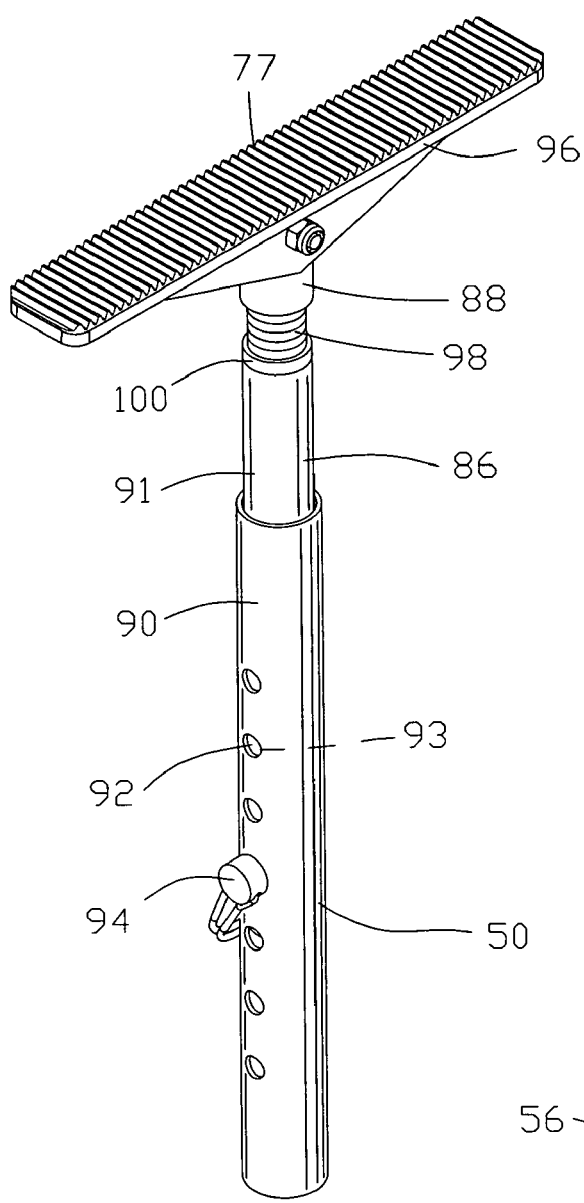
FIG. 9 is an enlarged isometric view of the second horizontal expander shown in FIG. 7.

FIG. 9 illustrates the distal end 86 of the vertical telescoping shaft 50. The vertical telescoping shaft 50 comprises plural hollow tubes comprising an outer tube 90 and an inner tube 91. The outer and inner tubes 90 and 91 have diameters selected to provide a smooth telescopic engagement. The inner tube 91 may be moved relative to the outer tube 90 to either lengthen or shorten the overall length of the vertical telescoping shaft 50. The vertical telescoping shaft 50 may be constructed of steel, aluminum or other similar material.

The outer and inner tubes 90 and 91 have a plurality of thru holes 92 and 93 defined along the length of the outer and inner tubes 90 and 91, respectively. Once the vertical telescoping shaft 50 is extracted such that the length of the vertical telescoping shaft 50 is commensurate with the length between the lower and upper horizontal surfaces 28 and 30 of the vehicle compartment 26, a mechanical fastener 94 passes through aligned thru holes 92 and 93 in the outer and inner tubes 90 and 91. The mechanical fastener 94 fixes the length of the vertical telescoping shaft 50. The mechanical fastener 94 may include a screw, pin or other similar fasteners.

A third vertical expander 88 coacts between the distal end 86 and the upper horizontal surface 30 of the vehicle compartment 26. The vertical expander 88 applies a vertical expanding force between the base 36 and the distal end 86 of the vertical telescoping shaft 50. The vertical expanding force between the between the base 36 and the distal end 86 of the vertical telescoping shaft 50 is applied to the lower and upper horizontal surface 28 and 30 of the vehicle compartment 26 for vertically stabilizing the base 36 within the vehicle compartment 26.

The vertical expander 88 comprises a third plate 96 pivotally secured to a third threaded shaft 98. The third plate 96 is pivotally secured to the third threaded receptacle 100 to conform to different contours and/or angles of the upper horizontal surface 30. Preferably, the third plate includes a textured material 77 to prevent the third plate 96 from slipping along the upper horizontal surface.

A third threaded receptacle 100 engages with the distal end 86 of the vertical telescoping shaft 50. The third threaded shaft 98 threadably engages with the third threaded receptacle 100.

Preferably, the third threaded receptacle 100 is press fitted into the inner tube 91 for enabling an operator to rotate the inner tube 91 and the third threaded receptacle 100 by hand without the use of tools. A rotation of the third threaded receptacle 100 causes the third plate 96 to expand outward to apply a vertical expanding force between the lower and upper horizontal surface 28 and 30 of the vehicle compartment 26. The engagement of the base 36 and the third plate 96 with the lower and upper horizontal surface 28 and 30 of the vehicle compartment 26 vertically stabilizes the base 36 within the vehicle compartment 26.

Although the invention discloses a vertical expander 88, it should be understood that a vertical expander may also comprise other means of providing a compressive force between the distal end 86 and the upper horizontal surface 30 of the vehicle compartment 26 including a single screw jack, hydraulic expanding means or other similar methods.

The first and second horizontal expanders 64 and 66 in combination with the vertical expander 88 stabilize the base 36 in three dimensions within the vehicle compartment 26. The base 36 is stabilized within the vehicle compartment 26 irrespective of the direction of force applied to the column 56.

The column 56 has a first and second distal end 102 and 104 respectively. The first distal end 102 of the column 56 has a vertical groove 106 to communicate with the interior pin 58 of the vertical channel 54 for aligning the column 56 relative to the base 36. The length of the vertical groove 106 is commensurate with the height of the interior pin 58 from the base surface 40 such that the column 56 is allowed to slide into the vertical channel 54 until the first distal end 102 of the column 56 is in contact with the base surface 40.

Figure 10:
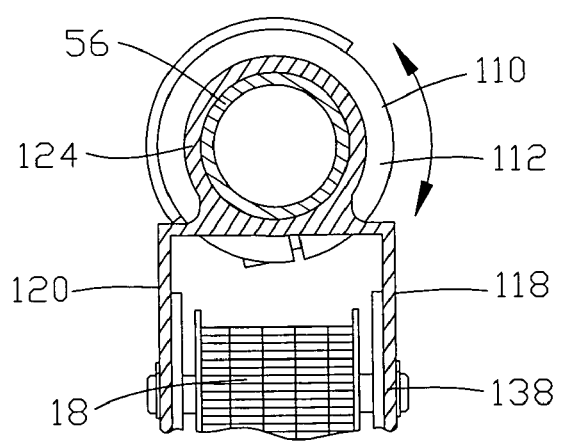
FIG. 10 is an enlarged isometric view of the vertical expander shown in FIG. 7.

FIG. 10 is a sectional view along line 10—10 in FIG. 3. The second distal end 104 of the column 56 has a collar 110 secured to the column 56. The collar 56 has a top and bottom edge 112 and 114 respectively. The top edge 112 of the collar 110 has a notch 116 to align and restrict the rotation of a boom 118. Preferably, the collar 110 is only mechanically fastened to the column 56 for enabling the collar 110 to be moved to allow for any alignment and/or adjustment of the boom 118 relative to the base 36. The collar 110 may be made of steel, aluminum or other similar material and may be mechanically fastened by screwing, clamping or other similar methods.

The boom 118 has a first and a second distal end 120 and 122. The first distal end 120 has a vertical sleeve 124 to slidably receive the column 56. The vertical sleeve 124 has a vertical groove 126 to communicate with the notch 116 of the collar 110 to align and restrict the rotation of the boom 118 relative to the column 56. The notch 116 limits the rotation of the boom 118 relative to the base 36.

The vertical sleeve 124 is preferably only slidably engageable with the column 56 and not permanently affixed to the column 56. The vertical sleeve 124 is slidably engageable with the column 56 in order to facilitate the separation of the boom 118 from the column 56 when the hoist 10 is no longer needed. The removal of the boom 118 from the column 56 minimizes the volume required to store both the boom 118 and the column 56 within the land vehicle 20. The boom 118 and vertical sleeve 124 may be permanently fastened together by bolting, welding or other similar methods. Preferably both the boom 118 and vertical sleeve 124 are made of steel, aluminum or other similar material.

The second distal end 122 of the boom 118 incorporates a telescoping shaft 128 for extending the overall length of the boom 118. The telescoping shaft 128 has a first and second distal end 130 and 132. The telescoping shaft 128 has a plurality of thru holes 134 along the length of the telescoping shaft 128. The first distal end 130 is inserted into the interior of the boom 118 and a mechanical fastener 136 passes through a thru hole 134 to secure the boom 118 relative to the telescoping shaft 128. Preferably the telescoping shaft 128 is made of steel, aluminum or other similar material.

A winch 138 is secured to the second distal end of the telescoping shaft to provide a winch drive. The strap 15 is coiled into the winch 138 when the winch 138 is activated to lift the load 12. When the winch 138 is activated to lower the load 12 the strap 15 is uncoiled from the winch 138. The winch 138 is powered by either the battery 16 contained in the load 12 or other power outlet such as the cigarette lighter of the land vehicle 20. Electrical current is transferred from the battery 16 to the winch 138 through a power cord 21 and controlled by a control box 17. The terminal end of the strap 15 contains the hook 19 that fastens the hoist 10 to a lifting bar 18 of the load 12.

The installation of the hoist 10 into a vehicle compartment 26 is accomplished without the use of mechanical fasteners or other permanent means. Typically, the hoist 10 may be installed and removed from the land vehicle 20 without the use of tools. The hoist 10 is installed in the following manner.

The base support 38 of the base 36 is placed upon the lower horizontal surface 28 in a preferred position that allows the hoist 10 to reposition the load 12 without interference with any obstructions inside the vehicle compartment 26 while permitting the vertical telescoping shaft 50 to vertically engage the upper horizontal surface of the vehicle compartment 26.

Once the location is established for the base 36 the horizontal telescoping shaft 44 is telescopically enlarged until the first and second plates 74 and 76 are in close proximity or in contact with the first and second vertical surface 32 and 43 of the vehicle compartment 26. The mechanical fastener 72 is passed through the aligned thru holes 70 and 71 of the outer and inner tubes 68 and 69 to fix the length of the horizontal telescoping shaft 44. The plurality of locking mechanisms 46 are used to secure the horizontal telescoping shaft 44 relative to the base 36.

The first and second threaded receptacle 82 and 84 is rotated upon the rotation of the inner tube 69. The second horizontal expander 66 causes the first and second plate 74 and 76 to expand outward to apply a horizontal engaging force between the first and second plate 74 and 76 and the first and second vertical surfaces 32 and 34 of the vehicle compartment 26 for horizontally stabilizing the base 36 within the vehicle compartment 26.

The vertical telescoping shaft 50 is telescopically enlarged until the third plate 96 is in close proximity or in contact with the upper horizontal surface 30 of the vehicle compartment 26. The mechanical fastener 94 is passed through the aligned thru holes 92 and 93 of the outer and inner tubes 90 and 91 to fix the length of the vertical telescoping shaft 50.

The third threaded receptacle 100 is rotated upon the rotation of the inner tube 91. The vertical expander 88 causes the third plate 96 to expand outward to apply a vertical engaging force between the third distal end 86 and the upper horizontal surface 28 of the vehicle compartment 26 for vertically stabilizing the base 36 within the vehicle compartment 26.

The vertical groove 106 of first distal end 102 of the column 56 is aligned with the interior pin 58 of the vertical channel 54 of the base 36 in order for the column 56 to slidably engage the vertical channel 54. The vertical sleeve 124 of the boom 118 is slidably received on to the column 56 until the vertical sleeve 124 comes into contact with the collar 110. The telescoping shaft 128 can be utilized for extending the overall length of the boom 118 if needed.

The boom 118 is positioned over the load 12 and the hook 19 is attached to the lifting bar 15 of the load 12. The operator starts the winch 138 by the control box 17 to coil the strap 18 from the winch 138. After the load 12 is raised to the proper height, the load 12 is rotated about column 56 until the load is in a proper position for lowering. The operator starts the winch 138 by the control box 17 to uncoil the strap 15 from the winch 138 to lower the load 12.

FIGS. 11–14 are various views of a second embodiment of the hoist 210 incorporating the present invention. Similar parts are labeled with similar reference numerals with the numerals of the second embodiment shown in FIGS. 11–14 being raised by two hundred over the numerals of the first embodiment shown in FIGS. 1–10.

FIG. 11 illustrates a hoist 210 incorporating the present invention for move load 212 between an external surface 214 and a land vehicle 220. In this example, the land vehicle 220 has been shown as a hatchback automobile, a minivan, van or a sports utility vehicle. However, it should be understood that the land vehicle 20 may be any suitable land vehicle.

FIG. 12 is an isometric view similar to FIG. 11 illustrating the hoist repositioning the load into the vehicle compartment 226 of the land vehicle 220. The land vehicle 20 is shown having a body 222 and a rear door 225 that allows access to a vehicle compartment 226. The vehicle compartment 226 comprises a lower and an upper horizontal surface 228 and 230 respectively and a first and second vertical surface 232 and 234 respectively. In this embodiment of the invention, the upper horizontal surface 228 of the land vehicle 220 is shown as a roof of a van, automobile or a sports utility vehicle.

Figures 13, 14:
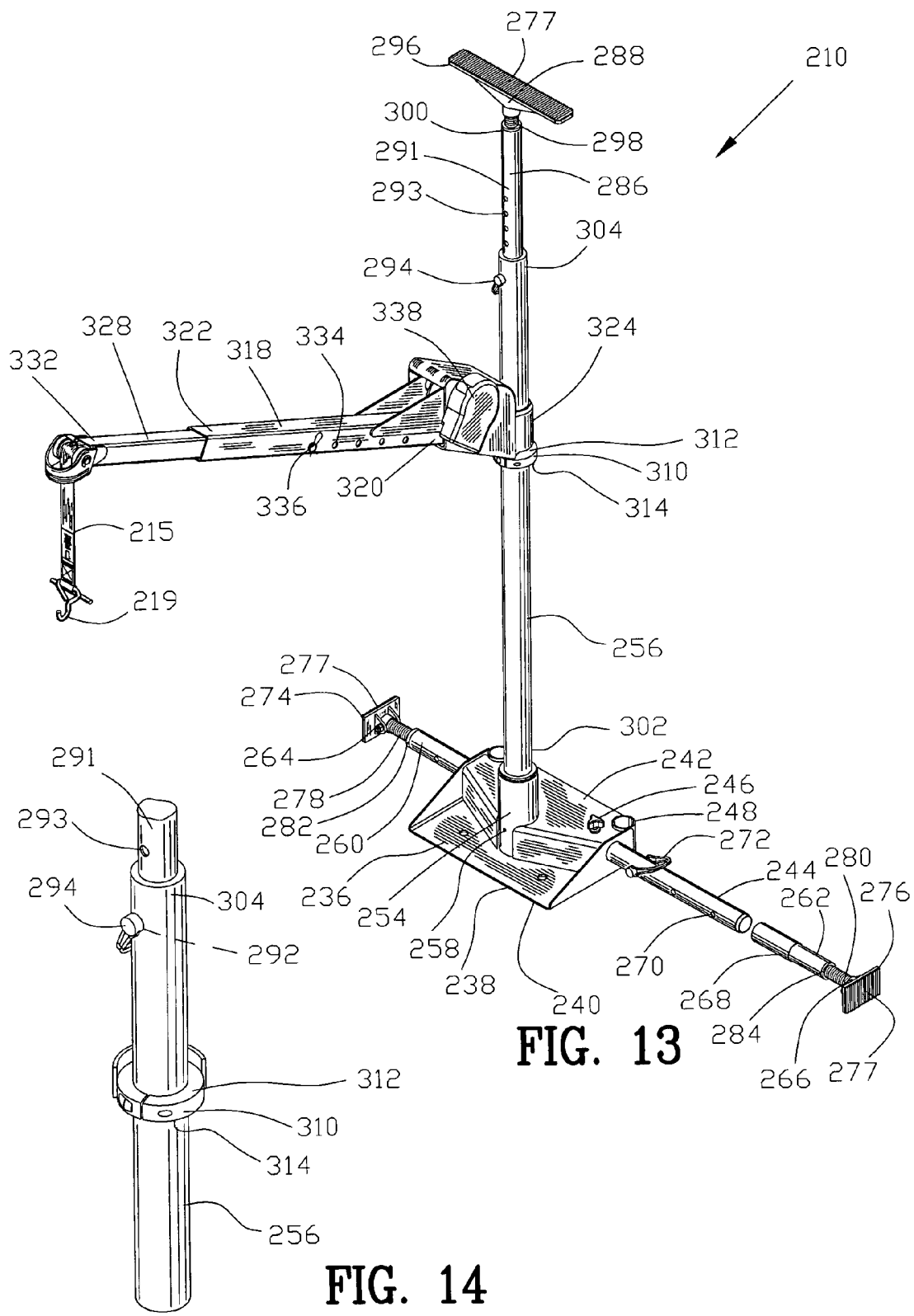
FIG. 13 is an enlarged isometric view of the second embodiment of the hoist of FIGS. 12 and 13.
FIG. 14 is an enlarged isometric view of a portion of the hoist shown in FIG. 13.

FIG. 13 is an enlarged isometric view of the hoist 210 shown in FIGS. 11 and 12. The hoist 210 comprises a base 236 having a base support 238 and a lower base surface 240 and an upper base surface 241. The base support 238 is in contact with the lower horizontal surface 228 of the vehicle compartment 226.

The base surface 140 includes a horizontal channel 142 for slidably receiving a horizontal telescoping shaft 144. The horizontal location of the base 136 relative to the vehicle compartment 126 may be adjusted by sliding the base 136 along the horizontal telescoping shaft 144 as heretofore described. A plurality of locking mechanisms 246 secures the horizontal telescoping shaft 244 relative to the base 236. The horizontal telescoping shaft 144 of FIGS. 11–14 operates in a fashion identical to the horizontal telescoping shaft 44 of FIGS. 1–10.

The base 236 may further comprises a vertical channel 254 to slidably receive a column 256. The vertical channel 254 has an interior pin to align and inhibit the rotation of the column 256.

FIGS. 13 and 14 illustrates a vertical telescoping shaft 250. The vertical telescoping shaft 250 includes plural hollow tubes comprising the column 256 and an inner tube 291. The column 256 and inner tube 291 have diameters selected to provide a smooth telescopic engagement. The inner tube 291 may be moved relative to the column 256 to either lengthen or shorten the overall length of the vertical telescoping shaft 50. The vertical telescoping shaft 50 may be constructed of steel, aluminum or other similar material.

The column 256 and inner tube 291 have a plurality of thru holes 292 and 293 defined along the length of the column 256 and inner tube 291, respectively. Once the vertical telescoping shaft 250 is extracted such that the length of the vertical telescoping shaft 250 is commensurate with the length between the lower and upper horizontal surfaces 228 and 230 of the vehicle compartment 226, a mechanical fastener 294 passes through aligned thru holes 292 and 293 in the column 256 and inner tube 291. The mechanical fastener 294 fixes the length of the vertical telescoping shaft 250.

A third vertical expander 288 coacts between the distal end 286 and the upper horizontal surface 230 of the vehicle compartment 226. The vertical expander 288 applies a vertical expanding force between the base 236 and the distal end 286 of the vertical telescoping shaft 250. The vertical expanding force between the between the base 236 and the distal end 286 of the vertical telescoping shaft 250 is applied to the lower and upper horizontal surface 228 and 230 of the vehicle compartment 226 for vertically stabilizing the base 236 within the vehicle compartment 226 as described previously.

The column 256 has a collar 310 secured to the column 256 for supporting a boom 318. The boom 318 is rotatable on the column 256 in a manner similar to FIGS. 1–10. A winch 338 is provided for lifting the load 212 as heretofore described. The winch 338 is powered by either the battery 216 contained in the load 212 or other power outlet such as the cigarette lighter of the land vehicle 220.

The hoist 210 is installed in a manner similar to FIGS. 1–10. However, it this embodiment of the invention, the vertical telescoping shaft 250 comprises the column 256 and the inner tube 291. The combination of the column 256 and the inner tube 291 provides a greater vertical height to the vertical telescoping shaft 250 for engaging the upper horizontal surface 228 or the roof surface of the land vehicle 220.

The present invention provides an improved hoist that requires no alterations of the interior of the vehicle. The improved hoist can be supported by the interior of the vehicle without the need for drilling holes for mechanical fasteners and can be utilized in different vehicle interior configurations. The improved hoist can be installed and removed from the interior of the vehicle without the need for professional assistance in a short period of time.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A hoist to reposition a load between a vehicle compartment and an external surface, the vehicle compartment having plural opposed surfaces and a lower horizontal surface, comprising:

a base having a base support and a base surface;

said base comprising a horizontal channel and a vertical socket and a vertical channel;

said base surface of said base being located on the lower horizontal surface of the vehicle compartment;
a horizontal telescoping shaft having a first and second distal end;
said horizontal channel of said base slidably receiving said horizontal telescoping shaft for adjusting the position of said base relative to each of said distal ends of said horizontal telescoping shaft to position said base at the desired location within the vehicle compartment;
said horizontal channel having a locking mechanism for securing the position of base to said horizontal telescoping shaft;
a horizontal expander located between said first and second distal ends of said horizontal telescoping shaft for applying a horizontal engaging force between said first and second distal ends and the opposed vertical surfaces of the vehicle compartment for horizontally stabilizing said base within the vehicle compartment;
a vertical telescoping shaft having a distal end;
said vertical socket of said base slidably receiving said vertical telescoping shaft;
said vertical socket having a locking mechanism for securing said base to said vertical telescoping shaft;
a vertical expander located between said base surface and said distal end of said vertical telescoping shaft for applying a vertical engaging force between the lower and upper horizontal surface of the vehicle compartment for vertically stabilizing said base within the vehicle compartment;
a column;
said vertical channel of said base slidably receiving said column; and
a boom mounted on said column to reposition the load between the vehicle compartment and the external surface.

2. A hoist to reposition a load between a vehicle compartment and an external surface, the vehicle compartment having plural opposed vertical surfaces and lower and upper horizontal surface, comprising:
a base having a base support and a base surface;
said base surface of said base being located on the lower horizontal surface of the vehicle compartment;
a horizontal telescoping shaft secured to said base having a first and second distal end;
a horizontal expander located between said first and second distal ends of said horizontal telescoping shaft for applying a horizontal engaging force between said first and second distal ends and the opposed vertical surfaces of the vehicle compartment for horizontally stabilizing said base within the vehicle compartment;
a vertical telescoping shaft secured to said base having a distal end;
a vertical expander located between said base surface and said distal end of said vertical telescoping shaft for applying a vertical engaging force between the lower and upper horizontal surface of the vehicle compartment for vertically stabilizing said base within the vehicle compartment;
a column extending from said base; and
a boom mounted on said column to reposition the load between the vehicle compartment and the external surface.

3. A hoist to reposition a load between a vehicle compartment and an external surface as set forth in claim 2, wherein said base surface of said base being located on a bottom horizontal surface of an automobile trunk compartment.

4. A hoist to reposition a load between a vehicle compartment and an external surface as set forth in claim 2, wherein said base surface of said base being located on a bottom horizontal surface of a van compartment.

5. A hoist to reposition a load between a vehicle compartment and an external surface as set forth in claim 2, wherein said boom mounted on said column to reposition a personal mobility vehicle between the vehicle compartment and the external surface.

6. A hoist to reposition a load between a vehicle compartment and an external surface as set forth in claim 2, wherein said base comprises a horizontal channel to slidably receive said horizontal telescoping shaft for adjusting the position of said base relative to each of said distal ends of said horizontal telescoping shaft to position said base at the desired location within the vehicle compartment; and
said horizontal channel having a locking mechanism for securing the position of base to said horizontal telescoping shaft.

7. A hoist to reposition a load between a vehicle compartment and an external surface as set forth in claim 2, wherein said base comprises a vertical socket to slidably receive said vertical telescoping shaft; and
said vertical socket having a locking mechanism for securing said base to said vertical telescoping shaft.

8. A hoist to reposition a load between a vehicle compartment and an external surface as set forth in claim 2, wherein said base comprises a plurality of vertical sockets to slidably receive said vertical telescoping shaft for accommodating various locations of said base such that said distal end of said vertical telescoping shaft will engage with the upper horizontal surface of the vehicle compartment; and
said plurality of vertical sockets having a locking mechanism for securing said base to said vertical telescoping shaft.

9. A hoist to reposition a load between a vehicle compartment and an external surface as set forth in claim 2, wherein said base comprises a vertical channel to slidably receive said column; and
said vertical channel having an interior pin to align and restrict the rotation of said column.

10. A hoist to reposition a load between a vehicle compartment and an external surface as set forth in claim 2, wherein said horizontal telescoping shaft comprises a plurality of hollow tubes each with differing diameters such that all of said hollow tubes will either extract or retract into the other said hollow tubes to either lengthen or shorten the overall length of said hollow tubes;
said plurality of hollow tubes having a plurality of thru holes along the length of said plurality of hollow tubes; and
a mechanical fastener passing through said plurality of thru holes to secure said plurality of hollow tubes.

11. A hoist to reposition a load between a vehicle compartment and an external surface as set forth in claim 2, wherein said horizontal expander comprises a first and second plate pivotally secured to a first and second threaded shaft respectively;
a first and second threaded receptacle engaged with said first and second distal ends of said horizontal telescoping shaft such that said first and second threaded receptacle rotate about the first and second distal ends of said horizontal telescoping shaft;
said first and second threaded shaft threadably engaged with said first and second threaded receptacle, respectively; and
said rotation of said first and second threaded receptacle will cause said first and second plate to expand outward to apply a horizontal engaging force between said first and second distal ends and the opposed vertical surfaces of the vehicle compartment for horizontally stabilizing said base within the vehicle compartment.

12. A hoist to reposition a load between a vehicle compartment and an external surface as set forth in claim 2, wherein said vertical telescoping shaft comprises a plurality of hollow tubes each with differing diameters such that all of said hollow tubes will either extract or retract into the other said hollow tubes to either lengthen or shorten the overall length of said hollow tubes;
   said plurality of hollow tubes having a plurality of thru holes along the length of said plurality of hollow tubes; and
   a mechanical fastener passing through said plurality of thru holes to secure said plurality of hollow tubes.

13. A hoist to reposition a load between a vehicle compartment and an external surface as set forth in claim 2, wherein said vertical expander comprises a plate pivotally secured to a threaded shaft;
   a threaded receptacle engaged with said distal end of said vertical telescoping shaft such that said threaded receptacle rotate about the distal end of said vertical telescoping shaft;
   said threaded shaft threadably engaged with said threaded receptacle; and
   said rotation of said threaded receptacle will cause said plate to expand outward to apply an vertical engaging force between the lower and upper horizontal surface of the vehicle compartment for vertically stabilizing said base within the vehicle compartment.

14. A hoist to reposition a load between a vehicle compartment and an external surface as set forth in claim 2, wherein said horizontal expander and said vertical expander stabilize said base in three dimensions within the vehicle compartment.

15. A hoist to reposition a load between a vehicle compartment and an external surface as set forth in claim 2, wherein said base comprises a vertical channel to slidably receive said column;
   said column comprises a first and second distal end;
   said first distal end having a vertical groove to communicate with a interior pin of said vertical channel for aligning said column relative to said base;
   said first distal end having a horizontal groove to communicate with said interior pin of said vertical channel for restricting the rotation of said column relative to said base;
   said second distal end having a collar secured to said column;
   said collar having a top and bottom edge; and
   said top edge of said collar having a notch to align and restrict the rotation of said boom.

16. A hoist to reposition a load between a vehicle compartment and an external surface as set forth in claim 2, wherein said column comprises a first and second distal end;
   said second distal end of said column having a collar secured to said column;
   said collar having a top and bottom edge;
   said top edge of said collar having a notch to align and restrict the rotation of said boom;
   said boom comprises a first and second distal end;
   said first distal end of said boom having a vertical sleeve to slidably receive said collar of said column;
   said second distal end of said boom having a telescoping shaft for extending the overall length of said boom;
   said telescoping shaft having a first and second distal end;
   said telescoping shaft having a plurality of thru holes along the length of said telescoping shaft;
   said first distal end of said telescoping shaft inserted into the interior of said boom and a mechanical fastener passing through said plurality of thru holes to secure said boom relative to said telescoping shaft; and
   a winch secured to said second distal end of said telescoping shaft to reposition the load between the vehicle compartment and the external surface.

17. A hoist to reposition a load between an automobile trunk and an external surface, the automobile trunk having plural opposed vertical surfaces and lower and upper horizontal surface, comprising:
   a base having a base support and a base surface;
   said base surface of said base being located on the lower horizontal surface of the vehicle compartment;
   a horizontal telescoping shaft secured to said base having a first and second distal end;
   a horizontal jack screw located between said first and second distal ends of said horizontal telescoping shaft for applying an horizontal engaging force between said first and second distal ends and the opposed vertical surfaces of the automobile trunk for horizontally stabilizing said base within the automobile trunk;
   a vertical telescoping shaft secured to said base having a distal end;
   a vertical jack screw located between said base surface and said distal end of said vertical telescoping shaft for applying a vertical engaging force between the lower and upper horizontal surface of the automobile trunk for vertically stabilizing said base within the automobile trunk;
   a column extending from said base; and
   a boom mounted on said column to reposition the load between the automobile trunk and the external surface.

18. A hoist to reposition a personal mobility vehicle between an automobile trunk and an external surface, the automobile trunk having plural opposed vertical surfaces and lower and upper horizontal surface, comprising:
   a base having a base support and a base surface;
   said base surface of said base being located on the lower horizontal surface of the vehicle compartment;
   a horizontal telescoping shaft secured to said base having a first and second distal end;
   a horizontal jack screw located between said first and second distal ends of said horizontal telescoping shaft for applying an horizontal engaging force between said first and second distal ends and the opposed vertical surfaces of the automobile trunk for horizontally stabilizing said base within the automobile trunk;
   a vertical telescoping shaft secured to said base having a distal end;
   said base comprises a plurality of vertical sockets to slidably receive said vertical telescoping shaft for accommodating various locations of said base such that said distal end of said vertical telescoping shaft will engage with the upper horizontal surface of the vehicle compartment;
   a vertical jack screw located between said base surface and said distal end of said vertical telescoping shaft for applying a vertical engaging force between the lower and upper horizontal surface of the automobile trunk for vertically stabilizing said base within the automobile trunk;
   a column extending from said base; and
   a boom mounted on said column to reposition the personal mobility vehicle between the automobile trunk and the external surface.

* * * * *